United States Patent
Zhao et al.

(10) Patent No.: US 10,418,686 B2
(45) Date of Patent: Sep. 17, 2019

(54) 8-SHAPED NFC ANTENNA WITH METAL BACK COVER

(71) Applicant: Shenzhen Sunway Communication Co., Ltd., Shenzhen, Guangdong (CN)

(72) Inventors: Anping Zhao, Shenzhen (CN); Hao Chen, Shenzhen (CN)

(73) Assignee: SHENZHEN SUNWAY COMMUNICATION CO., LTD., Shenzhen (CN)

( * ) Notice: Subject to any disclaimer, the term of this patent is extended or adjusted under 35 U.S.C. 154(b) by 948 days.

(21) Appl. No.: 14/897,143

(22) PCT Filed: Nov. 10, 2015

(86) PCT No.: PCT/CN2015/094187
§ 371 (c)(1),
(2) Date: Dec. 9, 2015

(87) PCT Pub. No.: WO2017/004916
PCT Pub. Date: Jan. 12, 2017

(65) Prior Publication Data
US 2019/0115647 A1    Apr. 18, 2019

(30) Foreign Application Priority Data
Jul. 8, 2015    (CN) .......................... 2015 1 0396782

(51) Int. Cl.
*H01Q 1/24* (2006.01)
*H04B 5/00* (2006.01)
*H01Q 7/00* (2006.01)

(52) U.S. Cl.
CPC .............. *H01Q 1/243* (2013.01); *H01Q 7/00* (2013.01); *H04B 5/0081* (2013.01)

(58) Field of Classification Search
CPC ........ H01Q 1/2208; H01Q 1/24; H01Q 1/241; H01Q 1/242; H01Q 1/243; H01Q 7/00;
(Continued)

(56) References Cited

U.S. PATENT DOCUMENTS

2009/0195469 A1* 8/2009 Lim ..................... H01Q 13/10
                                                           343/770
2014/0346886 A1   11/2014 Yang et al. ................... 307/104
(Continued)

FOREIGN PATENT DOCUMENTS

CN    203553340 U    4/2014
CN    104541292 A    4/2015
(Continued)

OTHER PUBLICATIONS

Chinese Office Action dated May 27, 2017, issued by the Chinese Patent Office in corresponding application CN 201510396782.X.
(Continued)

*Primary Examiner* — Hai V Tran
*Assistant Examiner* — Collin Dawkins
(74) *Attorney, Agent, or Firm* — Stein IP, LLC

(57) ABSTRACT

An 8-shaped NFC antenna includes a metal back cover and an antenna coil, the metal back cover comprises a first through-hole and a second through-hole, the antenna coil is located on the inner side of the metal back cover, the metal back cover is further provided with a first slit, the first slit is connected with the first through-hole and the second through-hole, the antenna coil surrounding the first through-hole and the second through-hole is in an 8 shape, and the current direction of the part of the coil surrounding the first through-hole and the current direction of the part of the coil surrounding the second through-hole are opposite.

14 Claims, 4 Drawing Sheets

(58) Field of Classification Search
CPC ........ H01Q 11/14; H04B 5/00; H04B 5/0025; H04B 5/0031; H04B 5/0037; H04B 5/0075; H04B 5/0081; H04B 5/0087; H02J 50/00; H02J 50/10
USPC .......................... 343/702, 872, 878, 787, 866
See application file for complete search history.

(56) References Cited

U.S. PATENT DOCUMENTS

| | | | |
|---|---|---|---|
| 2015/0138034 A1* | 5/2015 | Su | H01Q 1/526 343/842 |
| 2015/0171509 A1 | 6/2015 | Kato et al. | |
| 2015/0236401 A1* | 8/2015 | Yamaguchi | G06K 7/10316 343/702 |

FOREIGN PATENT DOCUMENTS

| | | |
|---|---|---|
| CN | 204333273 U | 5/2015 |
| CN | 104681917 A | 6/2015 |

OTHER PUBLICATIONS

Chinese Office Action dated Sep. 25, 2017, issued by the Chinese Patent Office in corresponding application CN 201510396782.X.
Extended European Search Report dated Jan. 13, 2017, issued by the European Patent Office in corresponding application EP 15797241.5.

* cited by examiner

8-SHAPED NFC ANTENNA WITH METAL BACK COVER

CROSS-REFERENCE TO RELATED APPLICATIONS

This application is a national stage of International Application No. PCT/CN2015/094187, filed Nov. 10, 2015, which claims the benefit of priority to Chinese Application No. CN201510396782.X, filed Jul. 8, 2015, in the State Intellectual Property Office, the disclosures of which are incorporated herein by reference.

TECHNICAL FIELD

The invention relates to the technical field of communication, in particular to an 8-shaped NFC antenna with a metal back cover.

DESCRIPTION OF RELATED ART

With the development of the near field communication of mobile devices in the current stage, NFC antennas have gradually become a favored object of customers, and therefore research on NFC antenna design has been attracting more and more attention. In general, an NFC antenna is placed on a battery, and a layer of ferrite is additionally arranged (between the NFC antenna and battery) in order to get good performance. With the favor of consumers, mobile devices with metal covers are starting to become popular, and it brings great difficulty to the design of NFC antennas. When an NFC antenna is directly put on the inner side of the metal cover, the metal back cover has a further shielding effect on the NFC antenna while an eddy current generated on the metal cover is in the direction completely opposite to the electric current of the NFC antenna, so that the antenna cannot be detected on the outer side of the metal back cover.

Once an appropriate treatment is made on the metal back cover, for example, a slit is formed in the edge of the metal back cover, the original completely opposite eddy current generated on the metal back cover is "cut off" at the edge position of the metal back cover, and an eddy current in the same direction as the electric current of the antenna is generated at the same time. The performance of the NFC antenna is enhanced by the contribution of the eddy current that has the same direction as the antenna itself, and meanwhile the slit formed on the metal back cover overcomes the shielding effect of the metal back cover on the NFC antenna, so that the NFC antenna can be detected on the outer side of the metal back cover. Currently, due to the fact that few feasible design schemes for NFC antennas with full metal back covers are available, in order to meet the needs of customers, research on NFC antennas with a full metal back cover has become necessary.

The China utility model patent CN203553340U discloses an NFC antenna with a double-C structure, starting from a camera through-hole to the left- and right-edge of the metal back cover two slits are formed leftwards and rightwards to cut off the original eddy current path, and the eddy current is controlled so that the negative effect cannot be generated. However, in this scheme the complete metal back cover is split into two parts by the two slits, so not only the attractive structural appearance is destroyed, but also the stability of the integral structure is further weakened. In addition, the structure of this scheme is complicated due to the fact that the two parts of the metal back cover are required to be independently processed and manufactured.

BRIEF SUMMARY OF THE INVENTION

The technical problem to be solved in this invention is to provide an 8-shaped NFC antenna with a metal back cover that has excellent performance and simple processing technology, while maintaining the integrity of the metal back cover.

In order to achieve the technical aim, the technical scheme adopted in the invention is that an 8-shaped NFC antenna with a metal back cover comprising a metal back cover and an antenna coil, wherein the metal back cover comprises a first through-hole and a second through-hole, the antenna coil is located on the inner side of the metal back cover, the metal back cover is further provided with a first slit, the first slit is connected with the first through-hole and the second through-hole, the antenna coil surrounds the first through-hole and the second through-hole is in an 8 shape, and the electric current direction of the part of the antenna coil surrounding the first through-hole and the electric current direction of the part of the antenna coil surrounding the second through-hole are opposite.

Furthermore, the metal back cover comprises a third through-hole.

Furthermore, the metal back cover comprises a second slit, and the second slit is connected with the second through-hole and the third through-hole.

Furthermore, the metal back cover comprises a plurality of through-holes connected in series with the first through-hole and the second through-hole with a plurality of slits.

Furthermore, the width of the slits is 0.5 mm-1.5 mm.

Furthermore, the width of the slits is 1 mm.

Furthermore, the sizes of the first through-hole and the second through-hole are 3 mm×3 mm-20 mm×20 mm.

Furthermore, the sizes of the first through-hole and the second through-hole are 5 mm×5 mm-10 mm×10 mm.

Furthermore, a finger print identification module, a camera module, a flashlight module or other sensor modules are placed accordingly in the first through-hole and the second through-hole.

The 8-shaped NFC antenna with a metal back cover has the advantages of the through-holes in the metal cover being skillfully applied, the effect of changing the flow direction of eddy currents is achieved by opening the slits between the through-holes, and thus the direction of the eddy current on the metal back cover will be the same as the antenna itself. The eddy current that has the same direction as the electric current of the antenna itself is used to enhance the performance of the antenna, meanwhile the shielding effect of the metal back cover on the NFC antenna is eliminated. The NFC antenna can be characterized by a simple structure, attractive appearance, excellent performance and the like. Compared with the double C-shape scheme, the integrity of the metal back cover is ensured, the metal back cover is integrally formed, and the processing technology is simple. Compared with an O-shaped NFC antenna, an effective eddy current generated by the 8-shaped NFC antenna is remarkably enhanced, thus the performance of the antenna is further improved; and good performance of the antenna can also be ensured even if the sizes of the through-holes are small.

MARK NUMBER EXPLANATION 1, metal back cover; 2, antenna coil; 3, first through-hole; 4, second through-hole; 5, first slit; 6, third through-hole; 7, second slit.

DETAILED DESCRIPTION OF THE INVENTION

In order to give a detailed description of the technical contents, aims achieved, and the effectiveness of the invention, the invention is explained with a combination of implementation manners and drawings.

The key concept of the invention is that the effect of changing the flow direction of the eddy currents is achieved by connecting through-holes through slits. The eddy currents, in the same directions as electric currents of the antenna itself, on the metal cover are used to enhance the performance of the antenna, and the 8-shaped structure is used to enhance the eddy current intensity of effective eddy current areas and further improve the performance of the antenna.

Figure 1:
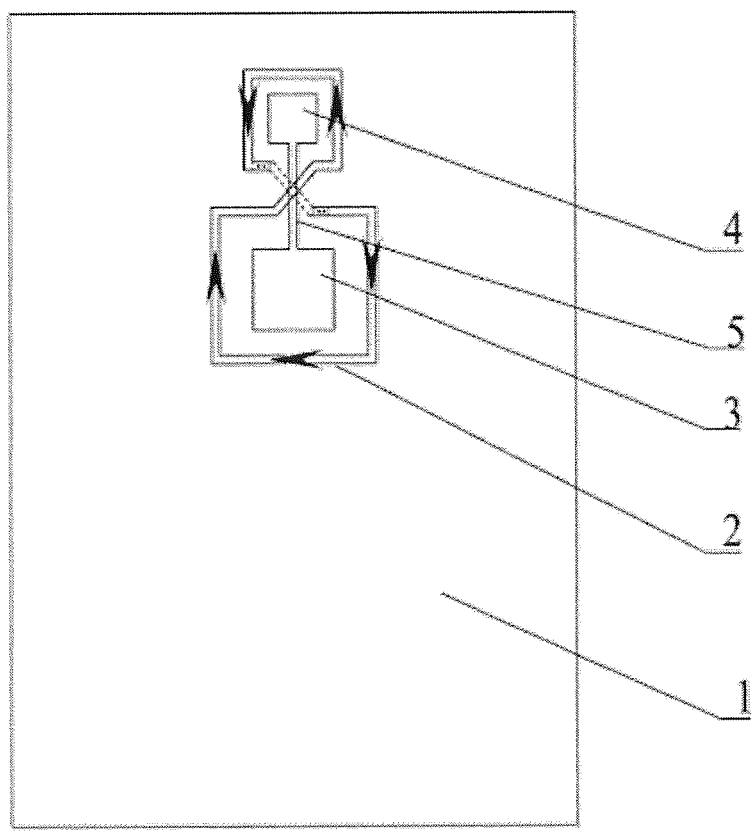
FIG. 1 is a structural diagram of an 8-NFC antenna with a metal back cover in embodiment 1 of the invention.

Please refer to FIG. 1, the 8-shaped NFC antenna with a metal back cover comprises a metal back cover and an antenna coil, the metal back cover comprises a first through-hole and a second through-hole, the antenna coil is located on the inner side of the metal back cover, the metal back cover is further provided with a first slit, the first slit is connected with the first through-hole and the second through-hole, and the antenna coil surrounds the first through-hole and the second through-hole is in an 8 shape. The electric current direction of the part of the antenna coil surrounding the first through-hole and the electric current direction of the part of the antenna coil surrounding the second through-hole are opposite.

It can be known from the description that the 8-shaped NFC antenna based on a metal back cover has the advantages of the through-holes in the metal cover being skillfully applied, the effect of changing the flow direction of the eddy currents is achieved by opening the slit that connects the through-holes. The eddy currents, in the same directions as the electric current of the antenna itself, of the metal cover are used to enhance the performance of the antenna, meanwhile the shielding effect of the metal back cover on the NFC antenna is eliminated, and the NFC antenna is characterized by attractive structural appearance, simple manufacturing technology, excellent performance and the like. Compared with an O-shaped NFC antenna, the effective eddy current generated by an 8-shaped NFC antenna is remarkably enhanced, the performance of the antenna is further improved, and the good performance of the antenna can also be ensured even if the sizes of the through-holes are small.

Furthermore, the metal back cover comprises a third through-hole.

Furthermore, the metal back cover comprises a second slit, and the second through-hole and the third through-hole is connected by the second slit.

Furthermore, the metal back cover comprises a plurality of through-holes connected in series with the first through-hole and the second through-hole through a plurality of slits.

It can be known from the description that the 8-shaped antenna with a metal back cover is suitable for situations requiring multiple through-holes, and the performance of the antenna can further be enhanced through multiple slits.

Furthermore, the width of the slits is 0.5 mm-1.5 mm, and 1 mm is preferred; the sizes of the first through-hole and the second through-hole are 3 mm×3 mm-20 mm×20 mm, and 5 mm×5 mm-10 mm×10 mm is preferred.

It can be known from the description that suitable sizes of the slits and the through-holes are selected to maintain the attractive appearance of the metal back cover while the performance of the antenna is ensured.

Furthermore, a finger print identification module, a camera module, a flashlight module or other sensor modules are arranged accordingly in the first through-hole and the second through-hole.

Embodiment 1

Please refer to FIG. 1, according to the embodiment 1 of the invention, the 8-shaped NFC antenna with a metal back cover is suitable for various portable mobile devices such as cell phones, iPads, laptop computers, learning machines and the like. The antenna comprises a metal back cover 1 and an antenna coil 2, the metal back cover 1 comprises a first through-hole 3 and a second through-hole 4, as shown in the drawing, the first through-hole 3 is located below the second through-hole 4. Actually, the first through-hole and the second through-hole can change positions and even have a lateral position relation. The finger print identification module, the camera module, the flashlight module or other sensor modules can be arranged in the first through-hole 3 and the second through-hole 4 respectively. The antenna coil 2 is located on the inner side of the metal back cover 1, in other words, on the side where a battery and a cell phone chip are placed, and the 8-shaped coil surrounds simultaneously the first through-hole 3 and the second through-hole 4, namely the direction of the part, rounding the first through-hole, of the antenna coil and the direction of the part, rounding the second through-hole, of the antenna coil are opposite, the electric current directions are opposite, when the electric current direction of the antenna coil 2 rounding the first through-hole 3 is clockwise, the electric current direction of the antenna coil 2 rounding the second through-hole 4 is anti-clockwise, the metal back cover 1 is further provided with a first slit 5, the first through-hole 3 and the second through-hole 4 is connected by the first slit 5, and the first slit 5 is intersected with the antenna coil 2.

Figure 2:
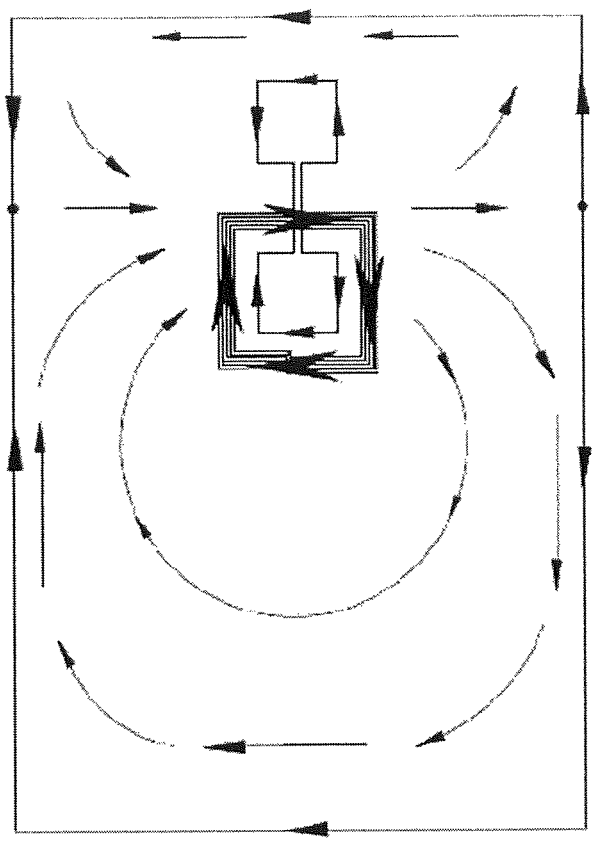
FIG. 2 is an eddy current distribution of an O-shaped antenna only surrounding the first through-hole.
Figure 3:
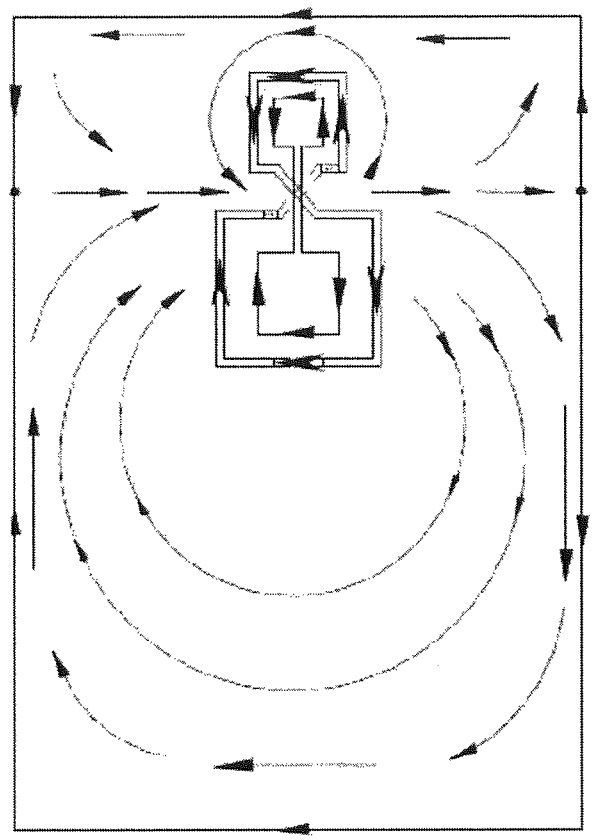
FIG. 3 is an eddy current distribution of the 8-shaped antenna in embodiment 1 of the invention.

The directions of the eddy currents can be changed by forming a slit between the two through-holes, an effective eddy current in the same direction as the electric current of the antenna is formed below the metal back cover, the performance of the antenna is enhanced, and the shielding effect of the metal back cover on the NFC antenna is eliminated so that the antenna can be detected on the outer side of the metal back cover. Meanwhile, the 8-shaped antenna coil is adopted in the antenna to further enhance the intensity of the effective eddy current. In the prior art, an antenna coil is generally in an O-shape surrounding only one through-hole. FIG. 2 is an eddy current distribution when the antenna coil only surrounds the first through-hole 3. Due to the fact that the slit is formed between the two through-holes, as well as the mutual induction and coupling between the antenna coil and the metal back cover, the eddy currents with opposite electric current directions are generated at the upper portion and the lower portion of the metal back cover 1, wherein the eddy current generated at the lower portion of the metal back cover and the electric current of the O-shaped NFC antenna coil are in the same direction, and therefore that part of the eddy current can be called the 'effective eddy current'. The effective eddy current in the same direction as the electric current of the NFC antenna coil itself enhances the radiation effect of the NFC antenna to the outside, therefore, in other words, the metal back cover can be regarded as a booster or amplifier of the NFC antenna, and the higher the intensity of the effective eddy current areas is, the better the performance of the NFC antenna is. Although the root cause generating the effective eddy current is the slit formed between the two through-holes, the sizes of the through-holes in the metal back cover also influence the intensity of the generated eddy currents, and the larger the through-holes are, the more intense the eddy currents are, and the better the performance of the antenna is. However, oversizing of the through-holes can influence the attractive appearance and stability of the metal back cover and may influence the layout of other parts on the inner side of the metal back cover. The key of the 8-shaped antenna is how to enhance the intensity of the effective eddy current effectively under the condition that the sizes of the through-holes in the metal back cover and the length of the slit are not changed, and FIG. 3 is the eddy current distribution of the 8-shaped antenna of the invention shown in FIG. 1. Compared the eddy current distributions in FIG. 2 and FIG. 3, one can be see that when the O-shaped NFC antenna coil only rounds the first through-hole 3, the intensity or density of the effective eddy current generated below the metal back cover is low, but when the 8-shaped NFC antenna coil rounds simultaneously the first through-hole 3 and the second through-hole 4, the intensity or density of the effective eddy current generated on the metal back cover 1 is enhanced to a large degree. The main reason that the enhanced effective eddy current can be generated at the lower portion of the metal back cover 1 of the 8-shaped NFC antenna is due to the fact that apart from the part of the 8-shaped NFC antenna coil rounding the first through-hole 3 located at the lower portion, the 8-shaped antenna coil has also another part rounding the second through-hole 4 located at the upper portion. Similar to the principle of the O-shaped NFC antenna, the 8-shaped NFC antenna coil rounding the first through-hole 3 at the lower portion generates the effective eddy current, corresponding to this coil, at the lower portion of the metal back cover; the antenna coil rounding the second through-hole 4 at the upper portion generates the effective eddy current at the lower portion of the metal back cover at the same time. Therefore, the superposition effect of the effective eddy currents is generated. Compared with the O-shaped NFC antenna, the effective eddy currents generated by the 8-shaped NFC antenna are remarkably enhanced, and therefore the performance of the 8-shaped NFC antenna is improved. It was shown by experimental results that when the first through-hole 3 and the second through-hole 4 are both of large sizes, for example, when the camera module or the fingerprint module is installed, the performance of the 8-shaped NFC antenna coil rounding simultaneously the two through-holes is improved by about 16%, compared to that of the O-shaped NFC antenna coil only rounding the first through-hole; when one of the two through-holes is of a large size, the other one is of a small size, for example, the flashlight module is installed, the performance of the 8-shaped NFC antenna rounding simultaneously the two through-holes is improved by about 31%, compared to that of the O-shaped NFC antenna only rounding the first through-hole. Therefore, the 8-shaped NFC antenna is more suitable for situations where the through-holes rounded by the NFC antenna coil are of small sizes. According to the experiment results, the width of the first slit is chosen to be 0.5 mm-1.5 mm, 1 mm is preferred, the sizes of the first through-hole and the second through-hole are 3 mm×3 mm-20 mm×20 mm, 5 mm×5 mm-10 mm×10 mm is preferred, 6 mm×6 mm is further preferred, the sizes of the first through-hole and the second through-hole can be either the same or different, and can be set as required.

Embodiment 2

Figure 4:
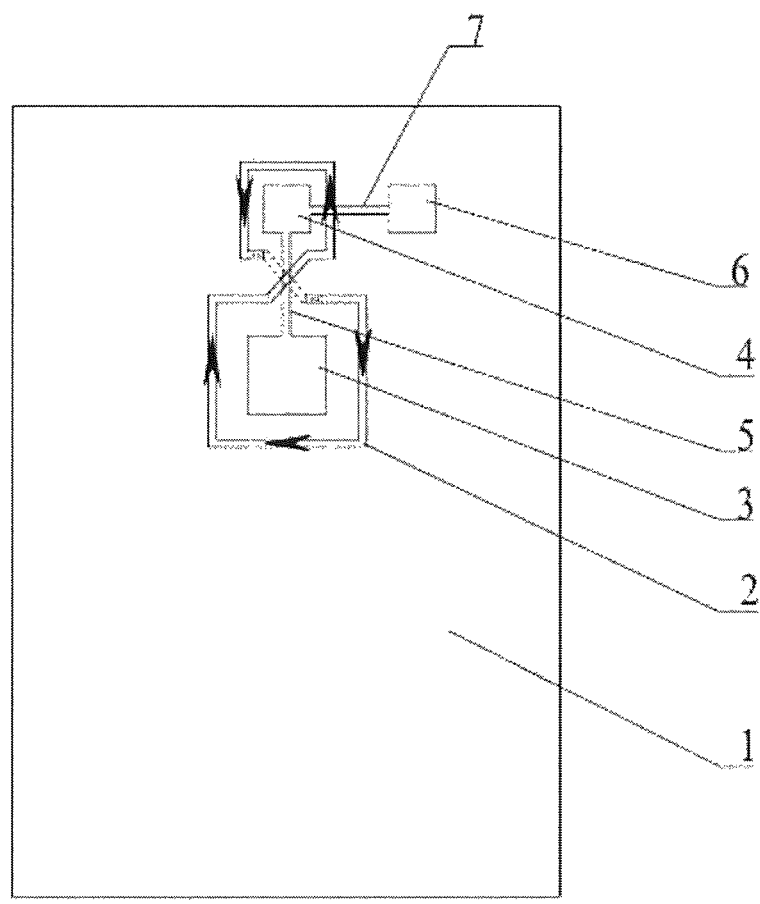
FIG. 4 is a structural diagram of the 8-NFC antenna with a metal back cover in embodiment 2 of the invention.

Please refer to FIG. 4, according to embodiment 2 of the invention, through-holes are additionally formed on the basis of embodiment 1, for example, a total of three, four, or five through-holes are formed, the sizes of the multiple through-holes can be the same or different, they can be set as 3 mm×3 mm-20 mm×20 mm, though 5 mm×5 mm-10 mm×10 mm is preferred, and 6 mm×6 mm is further preferred, the multiple through-holes can be connected through the multiple slits, the width of the multiple slits can be the same or different, they can be 0.5 mm-1.5 mm, and 1 mm is preferred; the 8-shaped NFC antenna coil can be arranged around any two adjacent through-holes, and generally, large through-holes are selected in order to obtain better performance. FIG. 4 shows the situation of three through-holes, the three through-holes can be a combination of a fingerprint identification through-hole, a camera through-hole and a flashlight through-hole, a second slit 7 can be formed between the second through-hole 4 and a third through-hole 6. It should be pointed out that the first slit 5 in the vertical direction must exist, and the second 7 in the lateral direction can be either existed or not. However, compared with the situation without the second slit 7, the performance of the NFC antenna is enhanced when the second slit 7 is existed.

In conclusion, according to the 8-shaped NFC antenna with a metal back cover, the through-holes in the metal cover are skillfully applied, the effect of changing the flow direction of the eddy currents is achieved by opening a slit between the through-holes, the effective eddy currents on the metal back cover that are in the same directions as the electric currents of the antenna itself are used to enhance the performance of the antenna, and the shielding effect of the metal back cover on the NFC antenna is eliminated; the 8-shaped NFC antenna with the metal back cover is characterized by a simple structure, attractive appearance, excellent performance and the like. The integrity of the metal back cover is ensured in the scheme compared with the double-C-shape scheme, the metal back cover is integrally formed, and the processing technology is simple. Compared with the O-shaped NFC antenna, the effective eddy currents generated by the 8-shaped NEC antenna are remarkably enhanced, and therefore the performance of the antenna is further improved. The good performance of the antenna can also be ensured even if the sizes of the through-holes are small. The above are only embodiments of the invention and are not to limit the patent scope of the invention. Any equivalent changes made according to the specification and drawing contents of the invention, or direct or indirect application to the relevant technical fields is all included in the patent protection scope of the invention.

The invention claimed is:

1. An 8-shaped NFC antenna with a metal back cover comprising a metal back cover and an antenna coil, wherein the metal back cover comprises a first through-hole and a second through-hole, the antenna coil is located on the inner side of the metal back cover, characterized in that the metal back cover is further provided with a first slit, the first through-hole and the second through-hole is connected by the first slit, the antenna coil surrounding the first through-hole and the second through-hole is in an 8 shape, and the electric current direction of the part of the antenna coil surrounding the first through-hole and the electric current direction of the part of the antenna coil surrounding the second through-hole are opposite;

wherein the metal back cover further comprises a plurality of through-holes in series connection with the first through-hole and the second through-hole through a plurality of slits.

2. The 8-shaped NFC antenna with the metal back cover according to claim 1, wherein the metal back cover further comprises a third through-hole.

3. The 8-shaped NFC antenna with the metal back cover according to claim 2, wherein the metal back cover further comprises a second slit, and the second through-hole and the third through-hole is connected by the second slit.

4. The 8-shaped NFC antenna with the metal back cover according to claim 3, wherein the sizes of the first through-hole and the second through-hole are 3 mm×3 mm-20 mm×20 mm.

5. The 8-shaped NFC antenna with the metal back cover according to claim 4, wherein the sizes of the first through-hole and the second through-hole are 5 mm×5 mm-10 mm×10 mm.

6. The 8-shaped NFC antenna with the metal back cover according to claim 3, further comprising a finger print identification module, a camera module, a flashlight module or other sensor module arranged accordingly in the first through-hole and the second through-hole.

7. The 8-shaped NFC antenna with the metal back cover according to claim 2, wherein the sizes of the first through-hole and the second through-hole are 3 mm×3 mm-20 mm×20 mm.

8. The 8-shaped NFC antenna with the metal back cover according to claim 7, wherein the sizes of the first through-hole and the second through-hole are 5 mm×5 mm-10 mm×10 mm.

9. The 8-shaped NFC antenna with the metal back cover according to claim 2, further comprising a finger print identification module, a camera module, a flashlight module or other sensor module arranged accordingly in the first through-hole and the second through-hole.

10. The 8-shaped NFC antenna with the metal back cover according to claim 1, wherein the width of the slits is 0.5 mm-1.5 mm.

11. The 8-shaped NFC antenna with the metal back cover according to claim 10, wherein the width of the slits is 1 mm.

12. The 8-shaped NFC antenna with the metal back cover according to claim 1, wherein the sizes of the first through-hole and the second through-hole are 3 mm×3 mm-20 mm×20 mm.

13. The 8-shaped NFC antenna with the metal back cover according to claim 12, wherein the sizes of the first through-hole and the second through-hole are 5 mm×5 mm-10 mm×10 mm.

14. The 8-shaped NFC antenna with the metal back cover according to claim 1, further comprising a finger print identification module, a camera module, a flashlight module or other sensor module arranged accordingly in the first through-hole and the second through-hole.

* * * * *